US011479373B2

(12) United States Patent
Chu et al.

(10) Patent No.: US 11,479,373 B2
(45) Date of Patent: Oct. 25, 2022

(54) SAMPLE COLLECTION SYSTEM FOR INTERPLANETARY VEHICLE

(71) Applicant: Honeybee Robotics, Ltd., Brooklyn, NY (US)

(72) Inventors: Philip Chu, Friendswood, TX (US); Justin Spring, San Gabriel, CA (US); Kris Zacny, Pasadena, CA (US)

(73) Assignee: HONEYBEE ROBOTICS, LLC, Longmont, CO (US)

( * ) Notice: Subject to any disclaimer, the term of this patent is extended or adjusted under 35 U.S.C. 154(b) by 614 days.

(21) Appl. No.: 16/367,994

(22) Filed: Mar. 28, 2019

(65) Prior Publication Data

US 2020/0055619 A1 Feb. 20, 2020

Related U.S. Application Data

(60) Provisional application No. 62/718,490, filed on Aug. 14, 2018.

(51) Int. Cl.
*B64G 1/66* (2006.01)
*G01N 1/14* (2006.01)
*H01J 49/04* (2006.01)

(52) U.S. Cl.
CPC .............. *B64G 1/66* (2013.01); *G01N 1/14* (2013.01); *H01J 49/0409* (2013.01); *H01J 49/0459* (2013.01)

(58) Field of Classification Search
CPC .............. B64G 1/66; B64G 2001/1064; B64G 2001/1071; B64G 1/105; G01N 1/14; G01N 2001/1031; G01N 2001/1445; G01N 2001/1025; H01J 49/0409; H01J 49/0459

USPC ........................................................ 73/863
See application file for complete search history.

(56) References Cited

U.S. PATENT DOCUMENTS

| 3,986,401 A | * | 10/1976 | Peterson | G01N 1/14 |
| | | | | 73/864.35 |
| 2004/0089079 A1 | * | 5/2004 | Engebretson | E21B 49/084 |
| | | | | 73/863.23 |
| 2008/0156985 A1 | * | 7/2008 | Venter | H01J 49/142 |
| | | | | 250/288 |
| 2008/0314166 A1 | | 12/2008 | Settles | |

(Continued)

OTHER PUBLICATIONS

Zacny, K., et al., "Novel Method of Regolith Sample Return from Extraterrestrial Body using a Puff of Gas" 1Honeybee Robotics Spacecraft Mechanisms Corporation, IEEEAC paper#1082, Version 5, Updated 2009:11:01 (pp. 1-10).
Zacny, Kris A., et al., "Pneumatic Excavator and Regolith Transport System for Lunar ISRU and Construction" American Institute of Aeronautics and Astronautics, Sep. 2008 (pp. 1-23).

(Continued)

*Primary Examiner* — Marrit Eyassu
(74) *Attorney, Agent, or Firm* — Cantor Colburn LLP

(57) ABSTRACT

A system and method of acquiring and delivering samples, such as in association with an interplanetary vehicle is provided. The system includes a gas delivery assembly having a storage tank with a compressed gas. A sampler device is provided having a hollow interior, the hollow interior having a curved and angled surface, an open end and an exit end. A plurality of nozzles are fluidly coupled between the hollow interior and the storage tank, at least one of the plurality of nozzles arranged to direct the compressed gas towards the exit end. A sample capture assembly is further provided having a container fluidly coupled to the exit end.

19 Claims, 17 Drawing Sheets

(56) References Cited

U.S. PATENT DOCUMENTS

| | | | |
|---|---|---|---|
| 2009/0223309 A1* | 9/2009 | Kurz | G01F 1/46 73/863.03 |
| 2011/0126643 A1 | 6/2011 | Zhang et al. | |
| 2012/0134140 A1* | 5/2012 | Keatch | G01N 1/08 362/101 |
| 2014/0245843 A1* | 9/2014 | Bry | G01N 1/2211 73/864.63 |
| 2015/0031072 A1* | 1/2015 | Fontova Sosa | G01N 1/14 435/30 |
| 2017/0307482 A1* | 10/2017 | Corso | G01N 35/08 |
| 2018/0188138 A1 | 7/2018 | Zhang et al. | |
| 2019/0011335 A1 | 1/2019 | Tavares et al. | |

OTHER PUBLICATIONS

Zacny, Kris et al., "Lunar Soil Mining Using Gas Flow" Revolutionary Aerospace Systems Concepts—Academic Linkage (RASC-AL), University of California, Berkeley, Apr. 28 to May 1, 2004 (15 pgs).

Zacny, Kris, et al., "Investigating the Efficiency of Pneumatic Transfer of JSC-1a Lunar Regolith Simulant in Vacuum and Lunar Gravity During Parabolic Flights" American Institute of Aeronautics and Astronautic, Aug. 2010 (pp. 1-10).

Zacny, Kris, et al., "Lunar Prospecting Rover Utilizing a Lunar Drill, Pneumatic Excavator, and Gas Jet Trencher" AIAA Space 2012 Conference (pp. 1-6).

Zacny, Kris, et al., "PlanetVac: Pneumatic Regolith Sampling System" 2014 IEEE Aerospace Conference (pp. 1-8).

International Search Report and Written Opinion for International Application No. PCT/US2019/39373 dated Sep. 18, 2019, 24 pgs.

\* cited by examiner

SAMPLE COLLECTION SYSTEM FOR INTERPLANETARY VEHICLE

CROSS REFERENCE TO RELATED APPLICATIONS

This application claims the benefit of U.S. Provisional Application Ser. No. 62/718,490, filed Aug. 14, 2018, the entire disclosure of which is incorporated herein by reference.

BACKGROUND

The subject matter disclosed herein relates to a system for collecting samples of soil on interplanetary missions, an in particular to a pneumatic sample acquisition and delivery system.

In planetary surface missions, robotic arms with scoops are used to capture soil and deliver that soil to scientific instruments on planetary landers or rovers. These systems rely on complex, costly robotic arm mechanisms to interact with the soil, acquire it, and transfer it. Examples include Viking, Phoenix, and Mars Science Laboratory missions on Mars, and the Surveyor mission on the Moon. Additionally, these sample acquisition systems are based on the use of gravity to capture soil within the scoop and to deposit the samples into a sample returned container or instruments. As a result, these systems would not function in microgravity environments such as on comets, asteroids, and other small planetary bodies, and have problems in Mars and other planetary bodies if sample is sticky/cohesive.

Accordingly, while existing sample collection systems are suitable for the intended purposes the need for improvement remains, particularly in providing a sample acquisition and delivery system having the features described herein.

BRIEF DESCRIPTION

According to one aspect of the disclosure a sample acquisition and delivery system is provided. The system includes a gas delivery assembly having a storage tank with a compressed gas. A sampler device is provided having a hollow interior, the hollow interior having a curved and angled surface, an open end and an exit end. A plurality of nozzles are fluidly coupled between the hollow interior and the storage tank, at least one of the plurality of nozzles arranged to direct the compressed gas towards the exit end. A sample capture assembly is further provided having a container fluidly coupled to the exit end.

According to another aspect of the disclosure a method of acquiring and delivering a sample is provided. The method includes directing pressurized gas into a hollow interior of a sampler device, the hollow interior having a curved angled surface with an open end and an exit end, the open end being in proximity to a surface containing the sample. A portion of the sample flows through the exit end with the pressurized gas. The portion is received in a container fluidly coupled to the exit end.

According to yet another aspect of the disclosure a sample acquisition and delivery system for an interplanetary vehicle is provided. The system includes a gas delivery assembly having a storage tank with a compressed gas. A sampler device is provided having a hollow interior, the hollow interior having a curved angled surface, an open end and an exit end. A plurality of nozzles is fluidly coupled between the hollow interior and the storage tank, at least one of the plurality of nozzles arranged to direct the compressed gas towards the exit end. A sample capture assembly having a container is distally located from the exit end. A conduit is fluidly coupling the exit end to the container.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure provide for a sample acquisition and delivery system that acquires, captures and stores a sample from a surface pneumatically without a mechanical linkage or implement. Embodiments of the present disclosure provide for a sample acquisition and delivery system that operates in environments with low/micro gravity or no gravity. Further embodiments of the present disclosure provide for a sample acquisition and delivery system that includes a sample acquisition device that may be arranged in the structure of an interplanetary vehicle, such as a foot pad for example. Still further embodiments of the present disclosure provide for a sample capture assembly that includes a container that receives the acquired sample from the acquisition device. In still further embodiments of the present disclosure, the sample capture assembly may be configured to remove and insert containers to allow multiple samples to be acquired.

Figure 1:
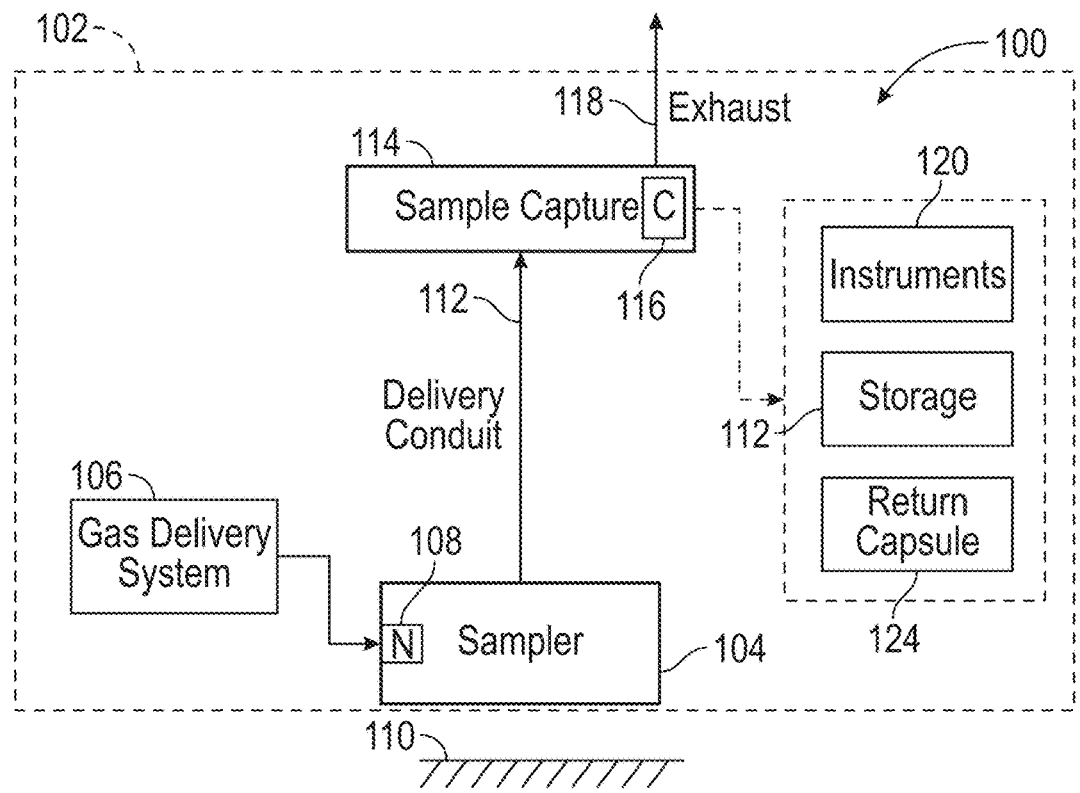
FIG. 1 is a schematic illustration of a sample acquisition and delivery system in accordance with an embodiment.

Referring now to FIG. 1, an embodiment is shown of a sample acquisition and delivery system 100 that is disposed within an interplanetary vehicle 102. The system 100 includes a sampler device 104 that is adapted to engage a surface containing a sample to be acquired. It should be appreciated that while embodiments herein may refer to the surface as being the surface on which the interplanetary vehicle 102 is positioned, this is for exemplary purposes and the claims should not be so limited. In other embodiments, the surface may be located in a bucket or a container, it may further be located on another interplanetary vehicle for example. Further, embodiments herein may refer to the sampler device 104 as being located on a footpad of the interplanetary vehicle. This is also for exemplary purposes and the claims should not be so limited. In other embodiments, the sampler device 104 may be located on a movable vehicle with wheels (e.g. a rover), tracks or another method of movement. The sampler device 104 may be coupled to a deployment mechanism to allow the sampler device 104 to engage a desired surface.

It should be appreciated that in embodiments where sampler device 104 is coupled to an arm, the arm configuration may be simpler than prior art arm mechanisms included a scooping or digging motion that required multiple degrees of freedom to operate. Further, in some embodiments, the surface may be disposed within a hole dug by a shovel or scoop associated the interplanetary vehicle 102. In still further embodiments, the sampler device 104 may be arranged to acquire samples from a shovel or scoop.

A gas delivery assembly 106 is fluidly coupled to the sampler device 104. The gas delivery assembly 106 includes at least one tank containing a compressed gas, such as nitrogen for example. The gas delivery assembly 106 interfaces with the sampler device 104 through one or more nozzles 108. The nozzles 108 direct the compressed gas into the sampler device 104 causing the sample from a surface 110. It should be appreciated that while FIG. 1 illustrates the surface 110 as being spaced apart from the sampler device 104, this is for clarity and in the illustrated embodiment, at least a portion of the sampler device 104 will be in direct contact with the surface 110. It should be appreciated that in other embodiments, at least a portion of the sampler device 104 is proximate the surface.

In an embodiment, the nozzles 108 direct compressed gas towards an exit port on the sampler device 104. The release of the compressed gas induces a flow from the sampler device 104 that carries the sample from the sampler device 104. In other embodiments, at least one of the nozzles 108 will have a wide angle of dispersion such that a first portion of the compressed gas is directed onto the surface to cause some of the surface material (e.g. soil, snow, rocks, granules) to dislodge from the surface 110 and be carried by a second portion of the compressed gas that is directed towards the exit port. In still further embodiments, at least one of the nozzles 108 directs the compressed gas directly at the surface 110, while the remainder of the nozzles 108 direct the compressed gas towards the exit port.

The exit port is coupled to a delivery conduit 112 that is arranged between the sampler device 104 and a sample capture assembly 114. It should be appreciated that the delivery conduit may include multiple components, such as but not limited to bellows and valves for example. It should be appreciated that while embodiments herein refer to the sample capture assembly 114 as being disposed within the interplanetary vehicle 102, this is for exemplary purposes and the claims should not be so limited. In other embodiments, the sample capture assembly 114 may be located external to the interplanetary vehicle. In still further embodiments, the sampler device 104 and gas delivery system 106 may be located in a first interplanetary vehicle (e.g. a movable vehicle) and the sample capture assembly 114 located in a second interplanetary vehicle with the delivery conduit 112 being an interface between the two vehicles.

The sample capture assembly 114 includes at least one container 116. The container 116 is fluidly coupled to the delivery conduit 112 and receives the sample from the delivery conduit 112. In an embodiment, a filter is associated with the container to prevent the sample from exiting the container via an exhaust conduit 118. In an embodiment, the sample capture assembly 114 includes a single container and acquires a single sample or multiple samples in the same container. In an embodiment, the container may be integrated with or cooperate with one or more analysis instruments 120. The analysis instruments may include, but are not limited to a mass spectrometer, a gas chromatograph, or a laser spectrometer for example.

In an embodiment, the sample capture assembly 114 may include a mechanism for inserting and removing the container 116. The container 116 may be moved from a position where it is fluidly coupled to the delivery conduit 112 to another position, such as in a storage container 122 where it will be stored until it is later analyzed by instruments 120 or returned to Earth for example. In still another embodiment, the mechanism may move the container 116 from the sample capture assembly 114 into a return capsule 124 which carries the sample back to Earth for further analysis. In an embodiment, the mechanism may be configured to insert a second container into the sample capture assembly 114 when the first container is removed.

Figure 2:
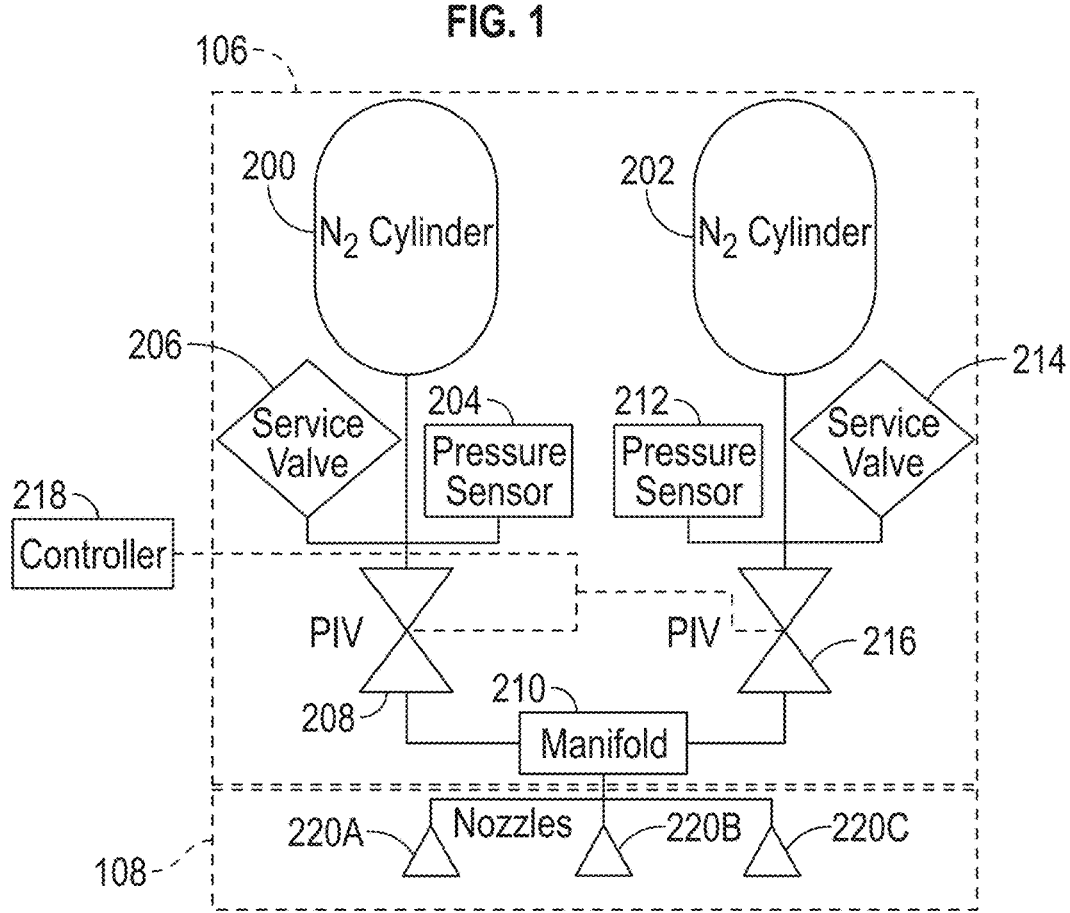
FIG. 2 is a schematic illustration of the gas delivery and sampler portions of the system of FIG. 1.

Referring now to FIG. 2, a non-limiting embodiment is shown of the gas delivery assembly 106 and nozzles 108. In this embodiment, the gas delivery assembly 106 includes a first tank 200 and a second tank 202. It should be appreciated that depending on the interplanetary mission goals, the gas delivery assembly 106 may have a single tank 200. In still other embodiments, the gas delivery assembly 106 may have more than two tanks 200. However, in the illustrated embodiment, the gas delivery assembly 106 includes two gas delivery pathways. This may be done to provide redundancy or to increase capacity for example. The tanks 200, 202 may be filled with a pressurized inert gas, such as nitrogen for example. The pressure of the gas may be changed to be suitable for the sample or samples that are intended to be collected.

Coupled to the tank 200 is a pressure sensor 204 and a service valve 206. The service valve 206 allows for the filling of the tank 200 prior to launch of the space vehicle 102 (i.e. before leaving Earth). In an embodiment, the service valve 206 is removed prior to launch.

The tank 200 is further coupled to a valve 208 that controls the flow of the compressed gas from the tank 200 to a manifold 210. In an embodiment, the valve 208 is a positive-isolation valve. In an embodiment, the valve 208 is a positive isolation valve manufactured by VACCO Industries of South El Monte, Calif. Coupled to the tank 202 is are the same set of components, namely a pressure sensor 212, a service valve 214 and a valve 216. The manifold 210 combines the flow of compressed gas from each of the flow paths of the tanks 200 and directs the compressed gas into the nozzles 108. The actuation of the valves 208, 216 may be controlled by a controller 218. The controller 218 may be a processor based controller having memory that is responsive to executable computer instructions for actuating the valves between an open and a closed position in response to a signal. In an embodiment, the signal is generated based on an input from a sensor, such as that the footpad of interplanetary vehicle 102 is in contact with a surface for example. In another embodiment, the signal is generated based on a determination that the interplanetary vehicle 102 is in a desired position. In still another embodiment the signal is in response to a communication from a remote computer.

In an embodiment, the nozzles 108 may be comprised of a plurality of nozzles 220A, 220B, 220C. In an embodiment, the nozzles 220A, 220B, 220C are all oriented the same relative to the surface 110. In an embodiment, the nozzles 220A, 220B, 220C are all configured the same, including the spray angle of the compressed gas and the flow rate of the compressed gas. In an embodiment, one or more of the nozzles 220A, 220B, 220C are at least partially oriented towards the surface 110. In still another embodiment, the one or more of the nozzles 220A, 220B, 220C has a spray angle that is larger than the other nozzles.

It should be appreciated that while the illustrated embodiment shows a plurality of nozzles, in other embodiments only a single nozzle is used. In an embodiment, at least a portion of single nozzle directs the pressurized gas flow towards an exit port of the sampler device.

Figure 3:
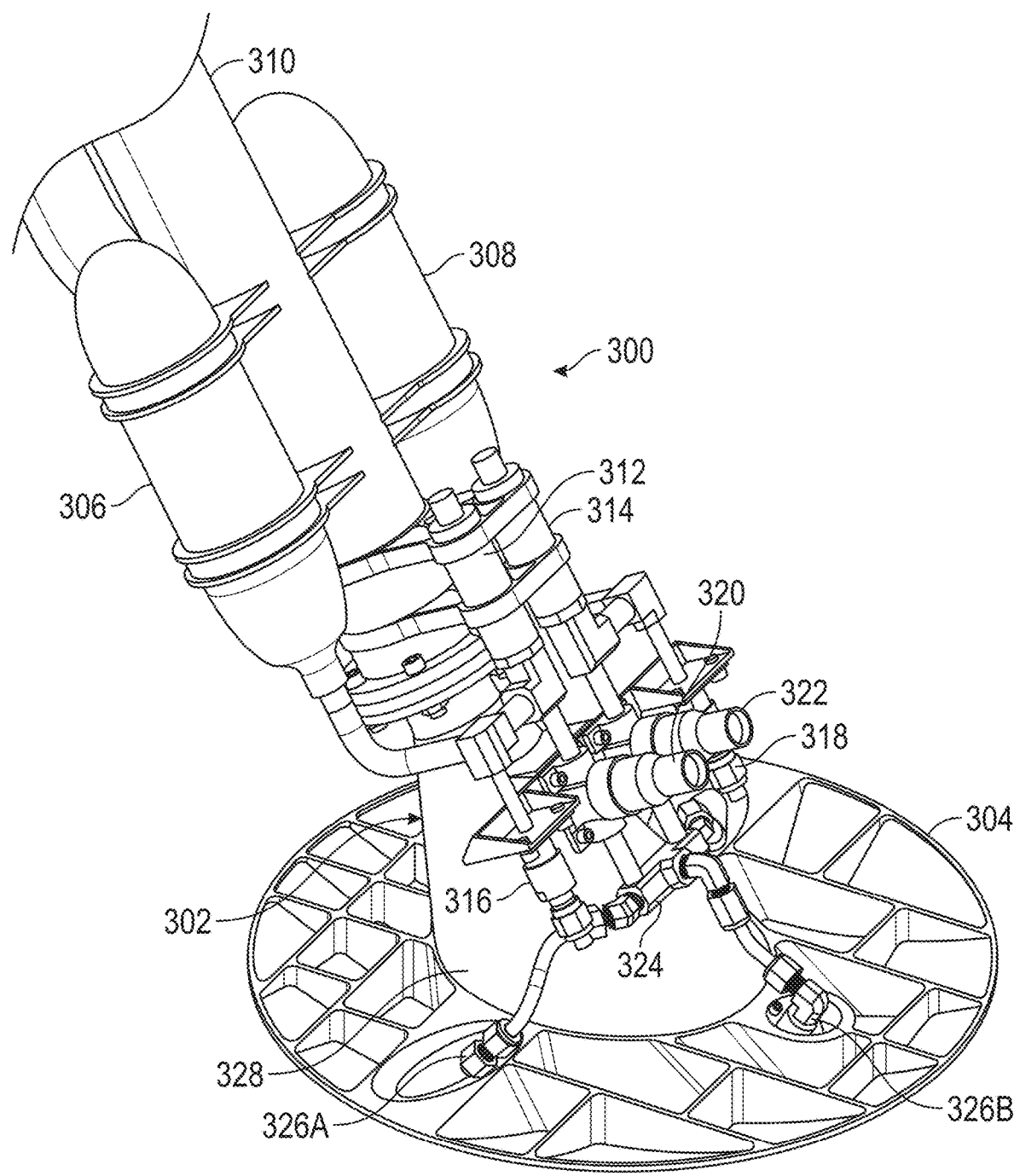
FIG. 3 is a partial top perspective view of an interplanetary vehicle leg and foot pad with a gas delivery and sampler portions of the system of FIG. 1 in accordance with an embodiment.
Figure 4:
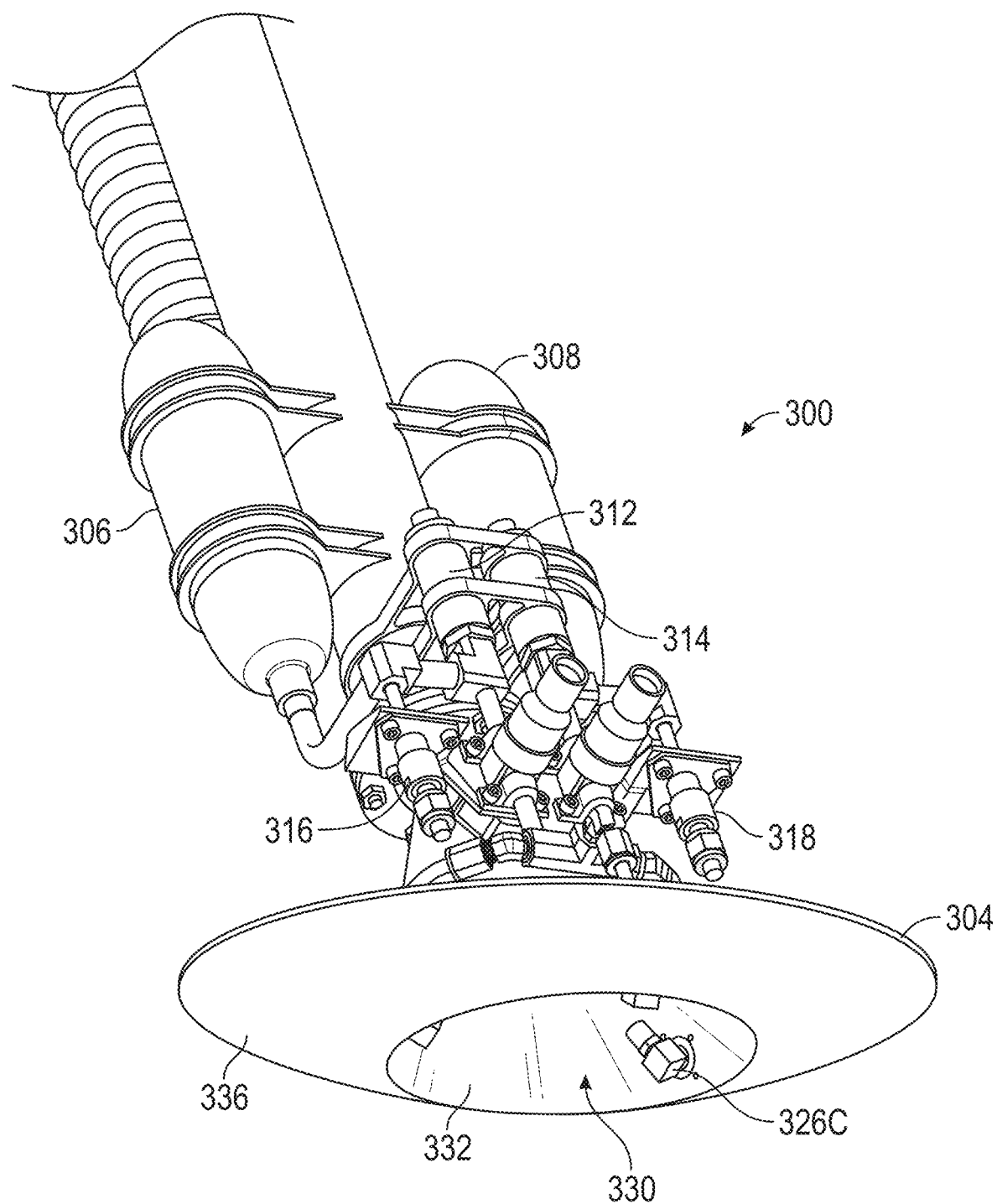
FIG. 4 is a partial bottom perspective view of the interplanetary vehicle leg and footpad of FIG. 3.
Figure 5:
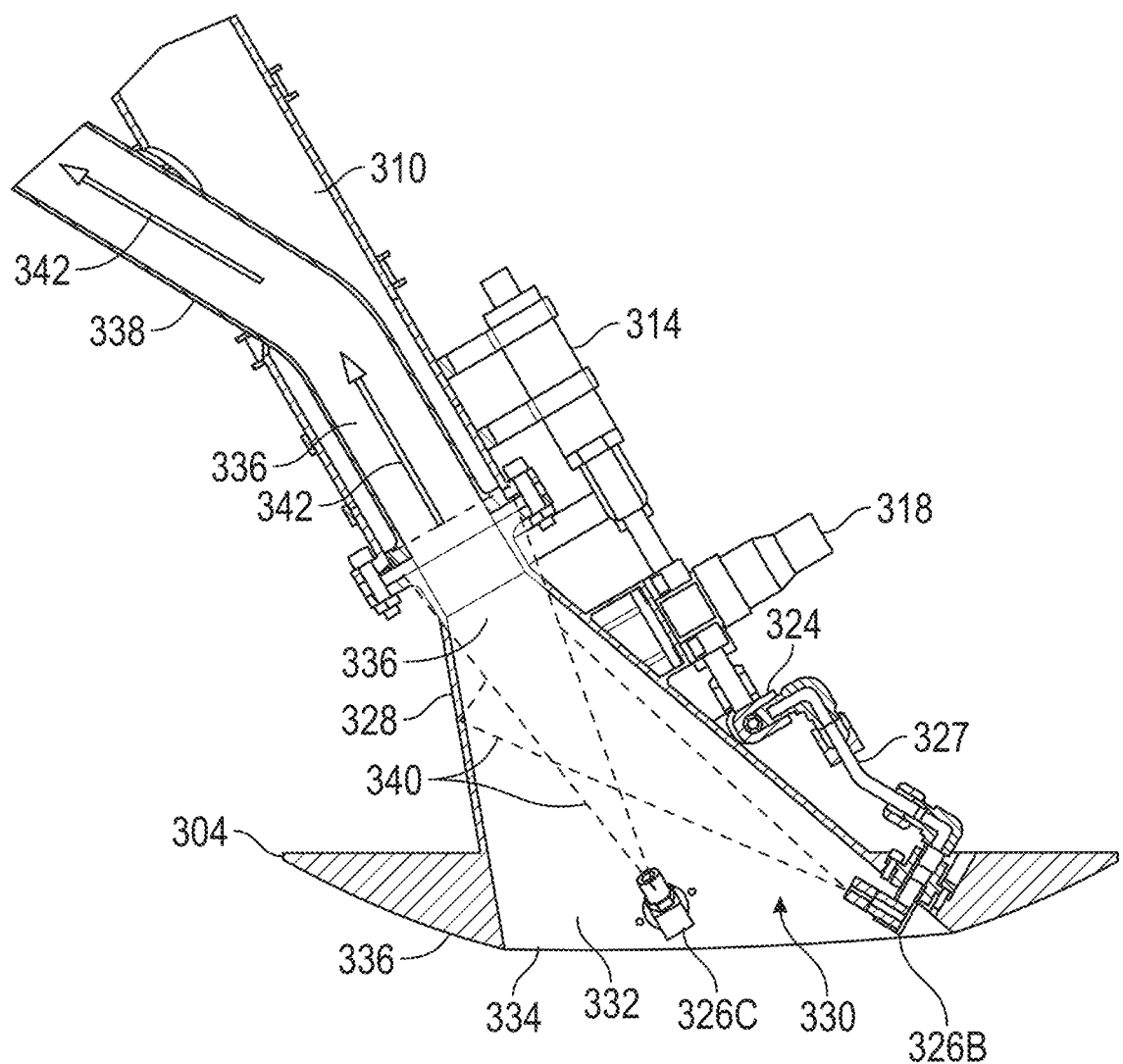
FIG. 5 is a schematic sectional view of the interplanetary vehicle leg and footpad of FIG. 3.

Referring now to FIGS. 3-5 an embodiment is shown of the gas delivery assembly 300 and a sampler device 302 incorporated into a foot pad 304 of the interplanetary vehicle 102. In this embodiment, the gas delivery assembly 300 includes a pair of tanks 306, 308 that are disposed on either side of a leg member 310 of the interplanetary vehicle 102. The leg member 310 couples the foot pad 304 to the body of the interplanetary vehicle. Each of the tanks 306, 308 are fluidly connected via conduits to a pressure sensor 312, 314, service valves 316, 318 and valves 320, 322. A manifold 324 combines the two gas streams. It should be appreciated that the gas delivery assembly 300 may be constructed in the same manner as the gas delivery assembly 106 shown in FIG. 2.

The manifold 324 is coupled to the nozzles 326A, 326B, 326C by conduits 327. The nozzles 326A, 326B, 326C are each couples to and extend through the footpad 304 into a body 328 of the sampler device 302. In an embodiment, the body 328 is integral with the foot pad 304. The body 328 includes a hollow interior portion 330 that is defined by a curved angled surface 332. It should be appreciated that while the illustrated surface 332 is approximately a conical surface, this is for exemplary purposes and the claims should not be so limited. In other embodiments, the surface 332 may have other shapes, for example, in some embodiments the surface 332 may curve around a portion of the interplanetary vehicle for example. The hold interior portion 330 has an open end 334 that is exposed to the environment. In an embodiment, the open end 334 is centrally located on the bottom surface 336 of the foot pad 304. On an opposite end of the hollow interior portion 330 is an exit port 336 that connects the body 328 to a conduit 338. In an embodiment, the conical surface 332 is disposed on an angle relative to the bottom of the foot pad 304. In an embodiment, the exit port 336 has an axis that is generally parallel to the leg 310.

In operation, the gas is released from the tanks 306, 308 by actuating one or both the valves 316, 318, through the manifold 324 and into the nozzles 326A, 326B, 326C. The nozzles 326A, 326B, 326C flow the compressed gas into the hollow interior 330. In the illustrated embodiment of FIGS. 3-5, all of the nozzles 326A, 326B, 326C have a spray angle 340 that directs the compressed gas stream towards the exit port 336. This induces a flow of gas through the exit port 336 into the conduit 338 as indicated by the arrows 342. It should be appreciated that the flow of gas 342 will carry particulate matter from the surface the open end 334 is sitting on into the conduit 338. In an embodiment, the exit port 336 is within the leg 310 and the conduit 338 exits through the side of the leg 310 adjacent the tanks 306, 308.

Figure 6:
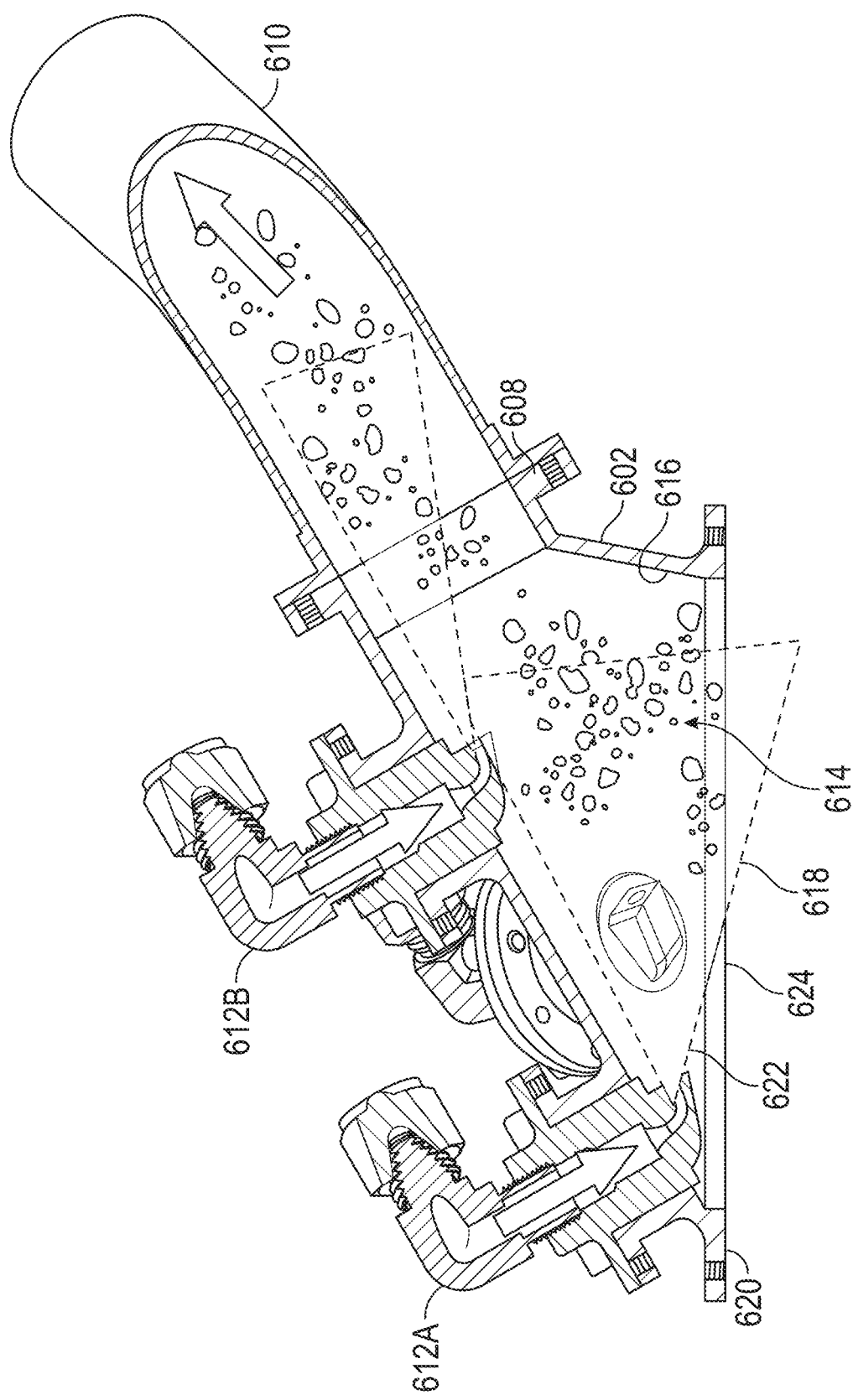
FIG. 6 is a schematic sectional view of the sampler portion of the system of FIG. 1 in accordance with another embodiment.
Figure 7:
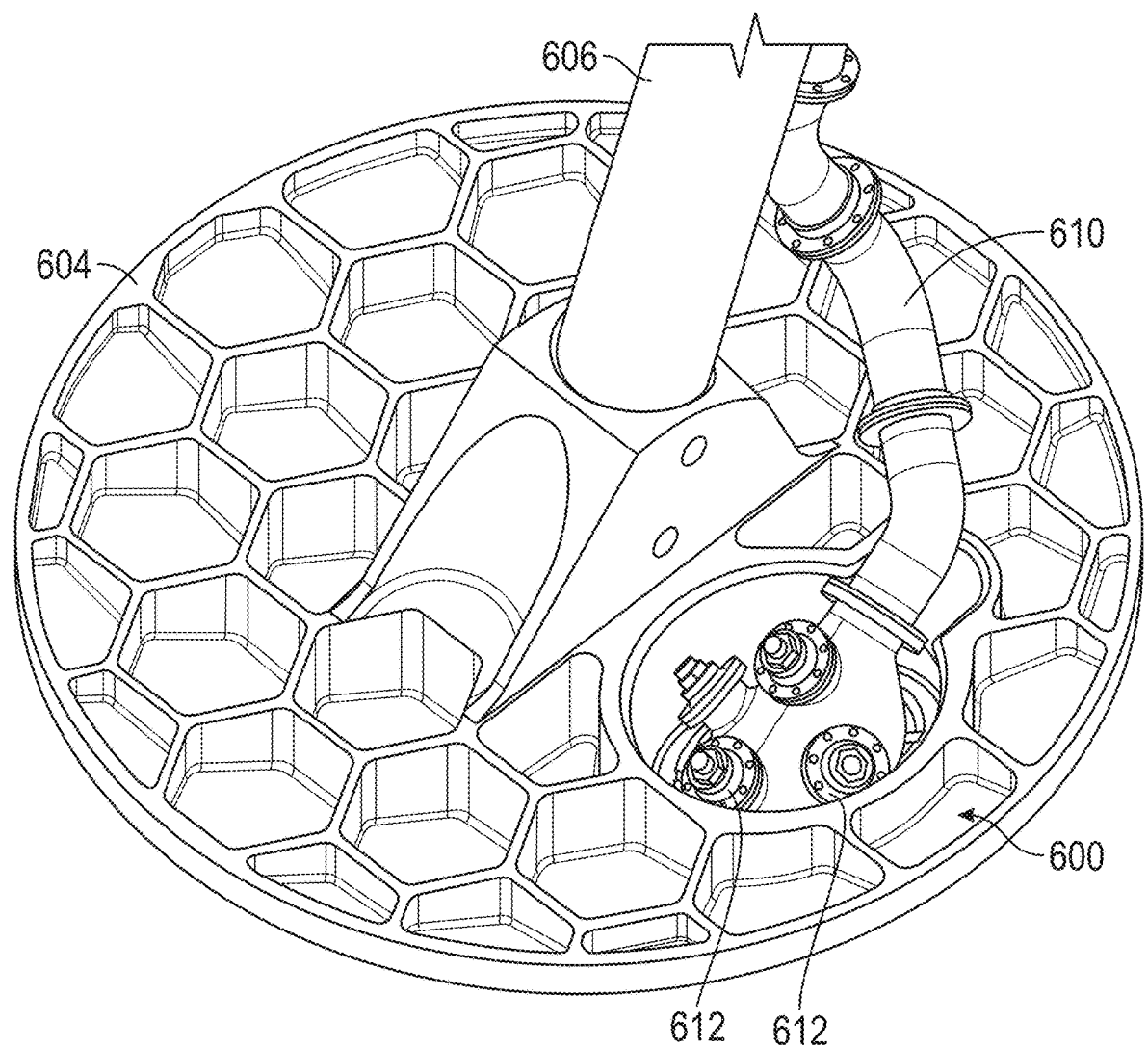
FIG. 7 is a partial top perspective view of an interplanetary vehicle leg and foot pad with a sampler portion of FIG. 6 in accordance with another embodiment.
Figure 8:
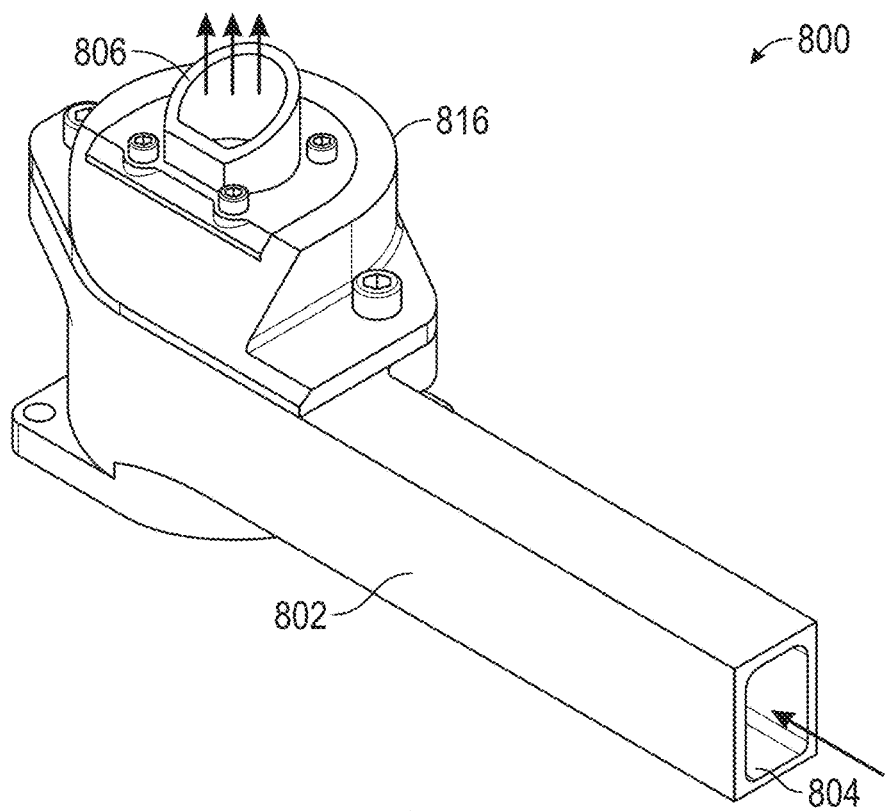
FIG. 8 is a top perspective view of a sample capture assembly for capturing the acquired sample in a container for the system of FIG. 1 in accordance with an embodiment.
Figure 9:
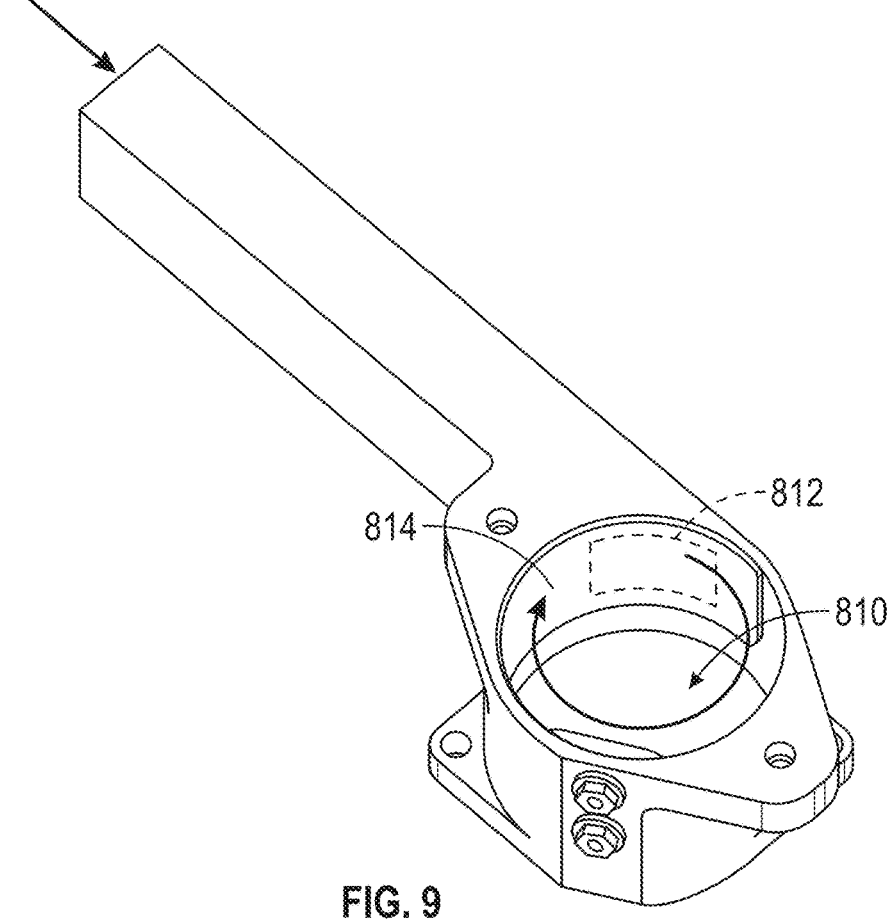
FIG. 9 is a top perspective view partially in section of the sample capture assembly of FIG. 8.
Figure 10:
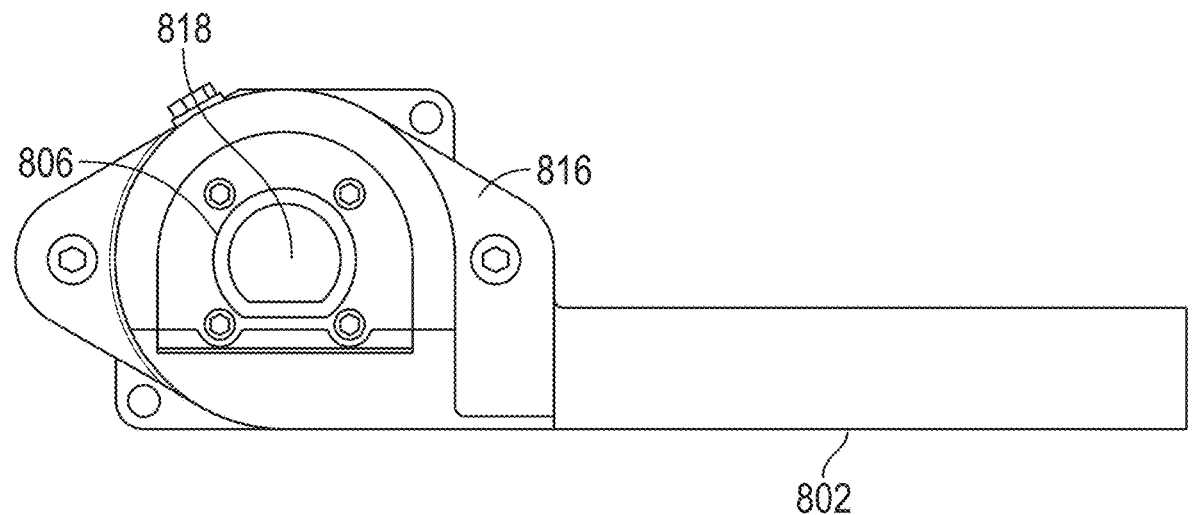
FIG. 10 is a top view of the sample capture assembly of FIG. 8.
Figure 11:
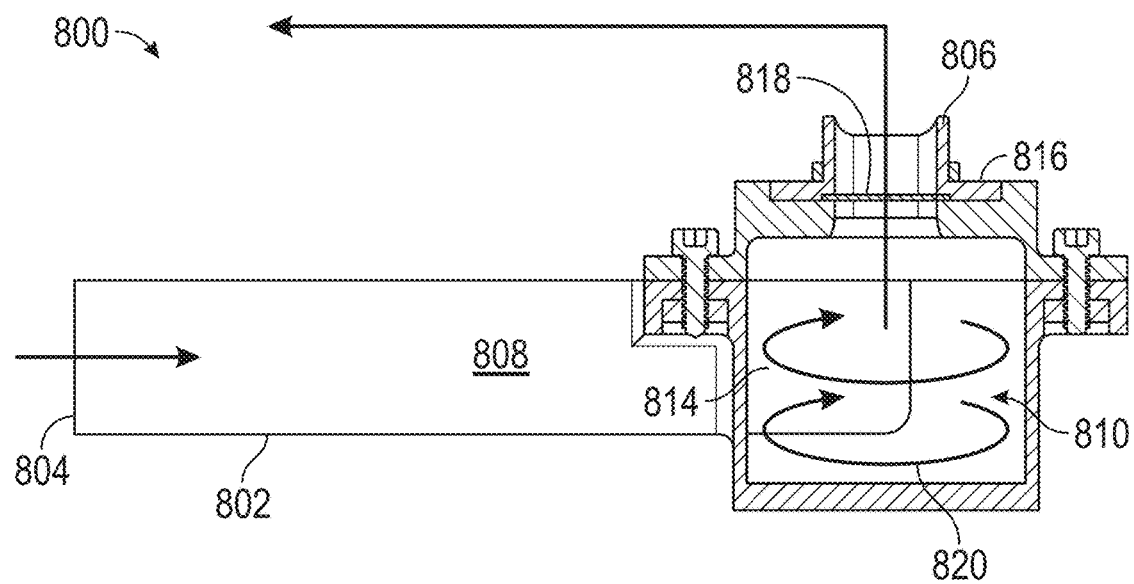
FIG. 11 is a schematic view illustrating the operation of the sample capture assembly of FIG. 8.

Referring now to FIG. 6 and FIG. 7, another embodiment is shown of a sampler device 600. In this embodiment, the sampler device 600 includes a body 602 that is coupled to a foot pad 604 of the interplanetary vehicle 102. In this embodiment, the body 602 is coupled to the foot pad 604 off center from the leg 606. The exit port 608 of the body 602 is coupled to a conduit 610 that is routed along the leg 606. A plurality of nozzles 612 are coupled to the conical portion of the body 602. It should be appreciated that the nozzles 612 are coupled to a gas deliver The body 602 includes a hollow interior portion 614 that is defined by a curved and angled interior surface 616. The surface 616 defines a cone that funnels the particulate 618 from the surface to the exit port 608.

In this embodiment, the nozzles 612 include a nozzle 612A and a nozzle 612B. The nozzle 612A is disposed closer to the bottom surface 620 of the body 602. The nozzle 612A is configured with a spray angle 622 that is large enough to direct a first portion of the compressed gas towards the surface (e.g. open end 624 of hollow interior 614) and a second portion towards the exit port 608. It should be appreciated that the directing of the gas towards the surface has the effect of disrupting the surface and dislodging some of the material on the surface into the hollow interior 614. The second nozzle 612B has a narrower spray angle that is directed into the exit port 608 and conduit 610. It should be appreciated that the material (e.g. soil) that is dispersed into the hollow interior 614 will be carried by the gas streams from nozzles 612 into the conduit 610.

Referring now to FIGS. 8-11, an embodiment is shown of a sample capture assembly 800. In this embodiment, the sample capture assembly 800 includes a body 802 having an inlet 804 and an outlet 806. The inlet 804 may be fluidly coupled to the conduit 112, 338, 610. Thus the gas and any sample material travel from the sampler device through the conduit to the inlet 804. The inlet 804 connects with a passageway 808 that is fluidly coupled to a chamber 810 by an opening 812. In the illustrated embodiment, the chamber 810 is cylindrical in shape. A flap member 814 is coupled on one end to the side wall of the chamber 810. The flap member 812 conforms to the shape of the side wall and is movable between an open position and a closed position. The flap member 814 is sized to cover the opening 812 when in the closed position and to move to a second or open position when gas flows through the passageway 808. In one embodiment, the flap member 814 is made from Kapton tape manufactured by E. I. du Pont de Nemours and Company.

In an embodiment, a cap member 816 covers the chamber 810 and includes the outlet 806. A filter 818 is arranged in the flow path between the chamber 810 and the outlet 806.

The filter 818 is configured to allow the gas to flow but not allow the particular sample to pass therethough.

In operation, the gas and sample mixture is received from the inlet 804. Due to the pressure of the gas, the flap member 814 moves to an open position allowing the gas and sample mixture to flow into the chamber 810. The gas and sample mixture circulates within the chamber 810 as indicated by the arrows 820. At this point, depending on the particulate sample being acquired, some or all of the particulate may separate from the gas stream due to cyclonic separation. In an embodiment, when the particles of the sample material contact the walls of the chamber 810 (or a container disposed therein), the particles lose their momentum and separate from the gas stream. In some embodiment, one or more deflector plates may extend into the chamber (or container) to assist in slowing down the particles. The gas then proceeds through the filter 818 out exits to an exhaust conduit via outlet 806. Once the pressure from the gas drops (e.g. due to the valves 208, 216, 318, 320 being closed), the flap member 814 closes and the sample material is captured within the chamber 810.

Figure 12:
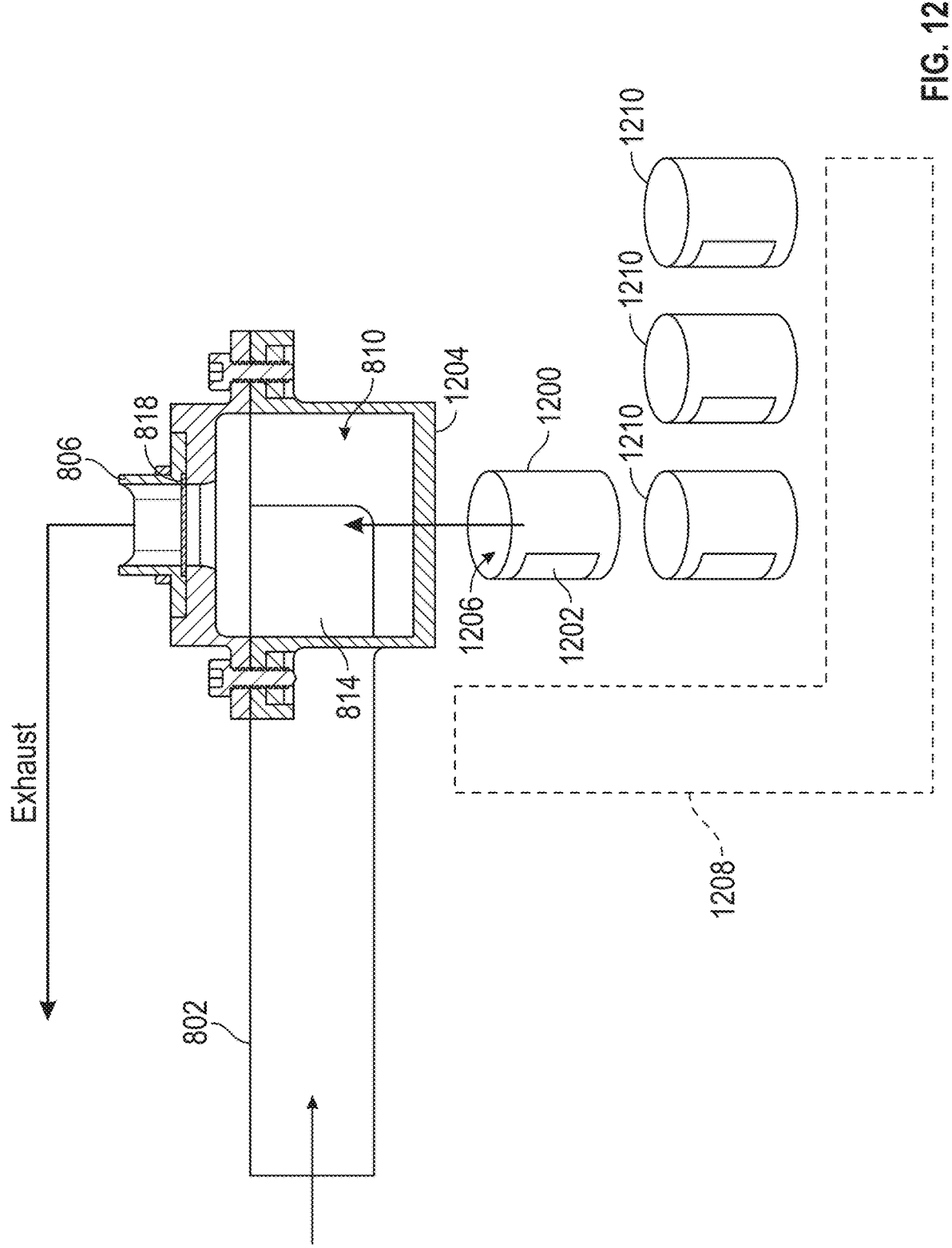
FIG. 12 is a schematic view of the sample capture assembly with a container movement assembly in accordance with an embodiment.
Figure 13:
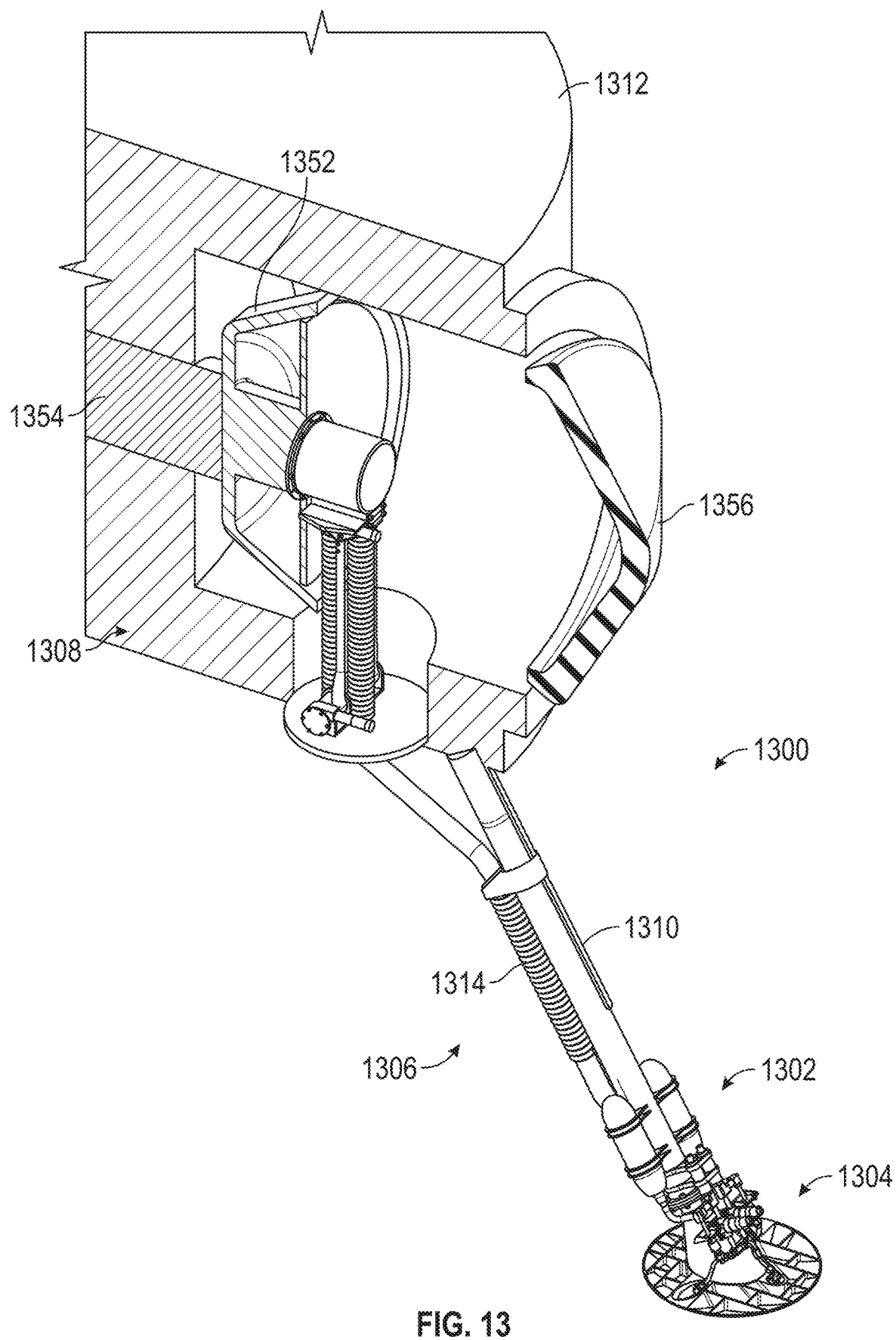
FIG. 13 is a perspective view partially in section of an interplanetary vehicle having a sample acquisition and delivery system in accordance with another embodiment.

In an embodiment, shown in FIG. 12, the bottom 1204 of the chamber 810 is open. This allows for a sample container 1200 to be inserted into the chamber 810. The sample container 1200 includes an opening covered by a flap member 1202 that operates similar to flap member 814. In an embodiment, the flap member 814 is not included and the opening in the side wall of the container 1200 is aligned with the opening 812 such that when the pressurized gas and particulate mixture engages the flap member 1202, the flap member 1202 moves allowing the gas and particulate mixture to pass into the container 1200.

The container 1200 has an open end 1206 that is aligned with the outlet 806. In operation, the gas and sample mixture enters the container 1200. The particulate matter separates and falls to the bottom of the container under cyclonic separation and the gas flows through the open end 1206, through the filter 818 and the outlet 806. In an embodiment, the container 1200 is inserted into and removed from the chamber 810 by a robotic container handling mechanism 1208. The mechanism 1208 may be any suitable mechanism for moving a container, such as a cylindrical container 1200 for example, from a first position into the chamber 810 and then remove the container 1200 to a second location. In an embodiment, a plurality of containers 1210 are provided that may be accessed and moved by the mechanism 1208. It should be appreciated that this embodiment allows for multiple samples to be acquired and stored separately. Once the sample is removed from the chamber 810, the mechanism 1208 may move the container 1200, 1210 to an instrument to be analyzed, into storage for later analysis, or stored in a return capsule. In an embodiment, the containers 1200, 1210 may be adapted to cooperate with a carousel mechanism (e.g. a rotating carrier).

In some embodiments, the sampler device 104, 302, the conduit 112, 338 and the sample capture assembly 114, 800 may be purged or cleaned by flowing pressurized gas from the tanks through the system.

In an embodiment, the chamber 810 is integrated with an analysis instrument and the samples may be analyzed directly from the chamber 810.

Referring now to FIGS. 13-23, another embodiment is shown of a sample acquisition and delivery system 1300. In this embodiment, the system 1300 has a gas delivery assembly 1302, a sampler device 1304, a delivery conduit 1306 and a sample capture assembly 1308. In this embodiment, the gas delivery assembly 1302 is the same as gas delivery system 300 and the sampler device 1304 is the same as sampler device 1304 of FIG. 3.

The delivery conduit 1306 exits the leg 1310 near the gas delivery system 1302 and is positioned adjacent the leg as the conduit proceeds towards the interplanetary vehicle 1312. In an embodiment, the conduit 1306 may include a bellows 1314 that allows the conduit 1306 to change in length to accommodate changes in the length of the leg 1310.

Figure 15:
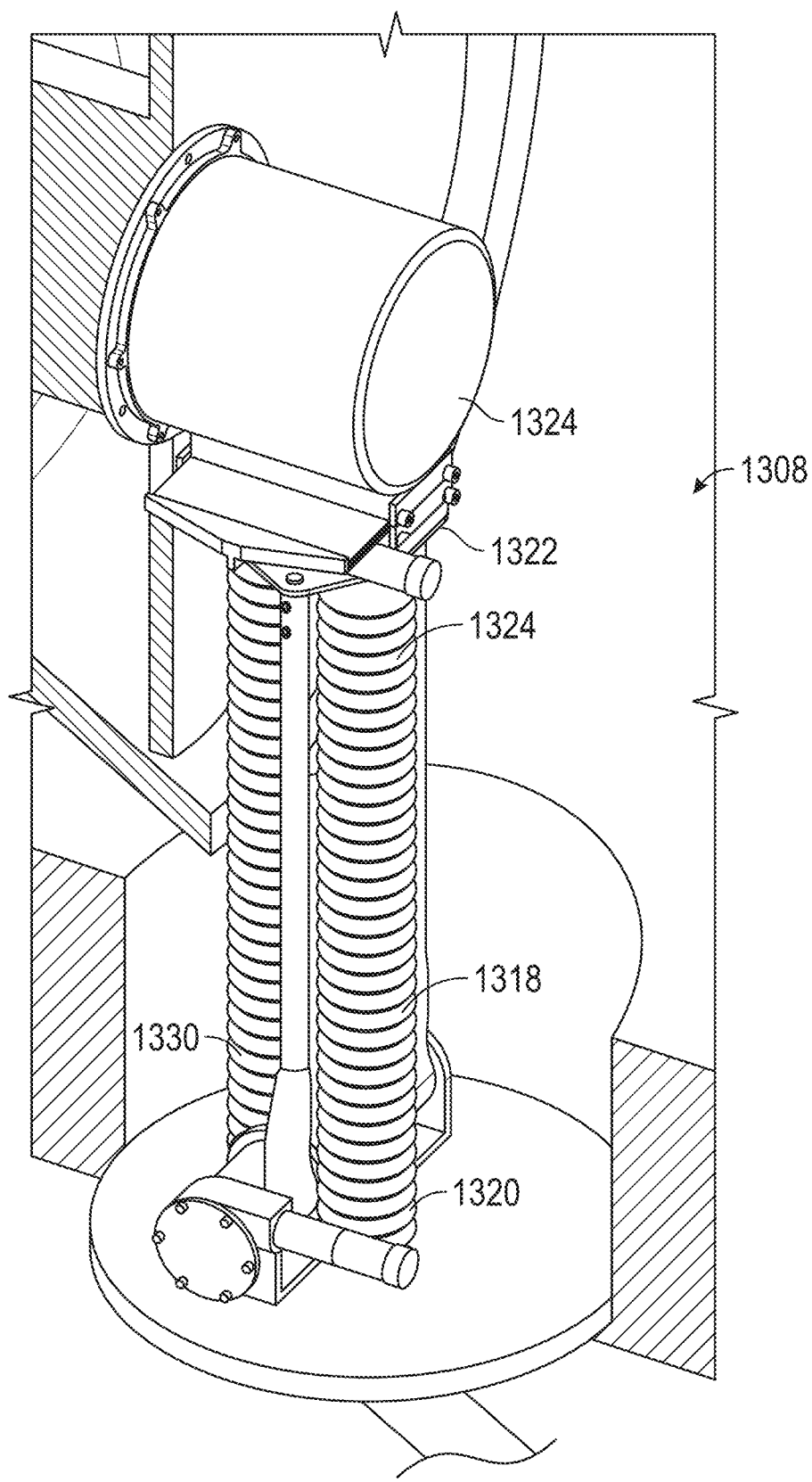
FIG. 15-23 illustrate various views of a sample capture assembly for the sample acquisition and delivery system of FIG. 13 in accordance with an embodiment.
Figure 16:
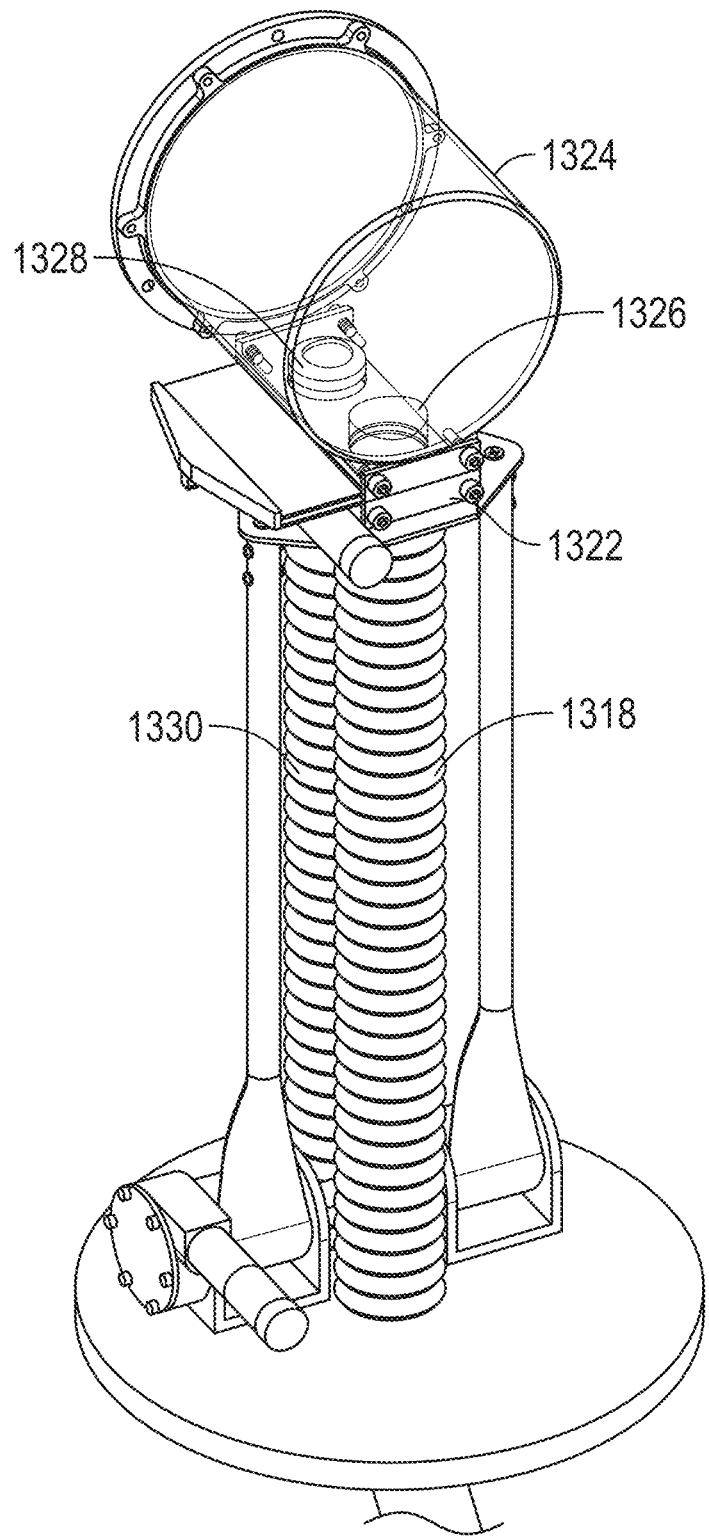
Figure 17:
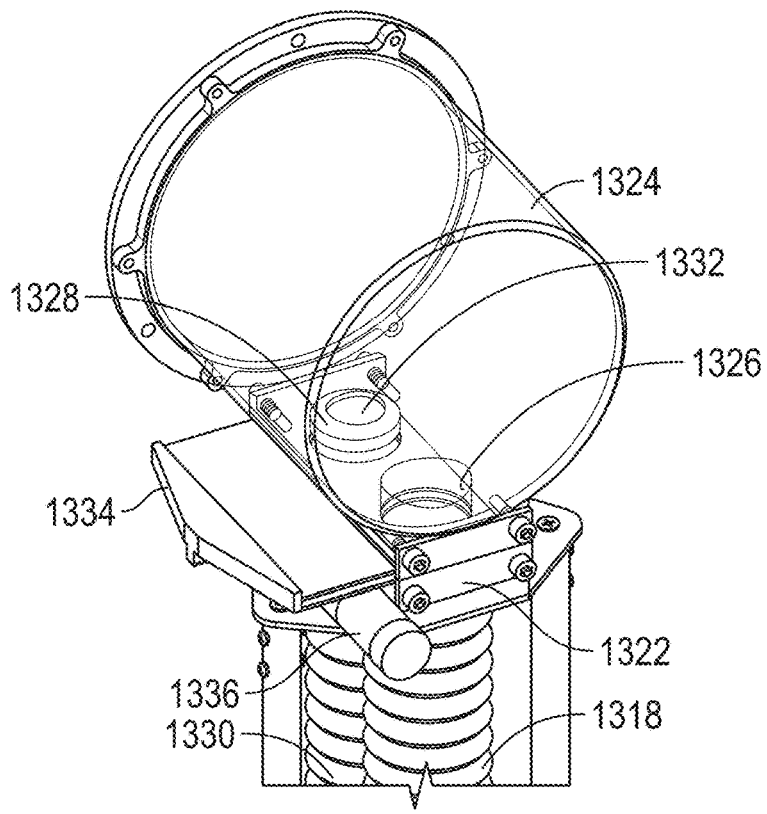
Figure 18:
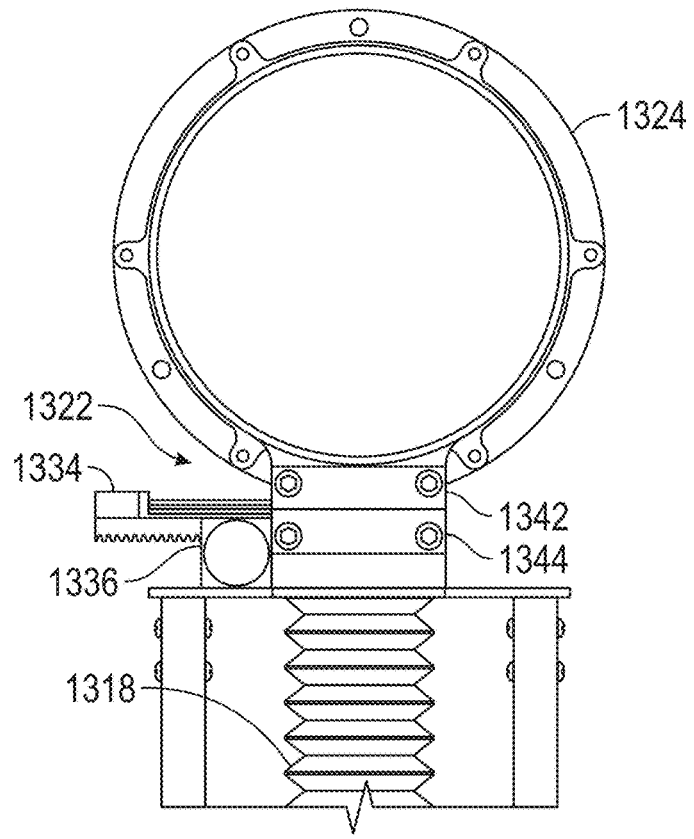
Figure 19:
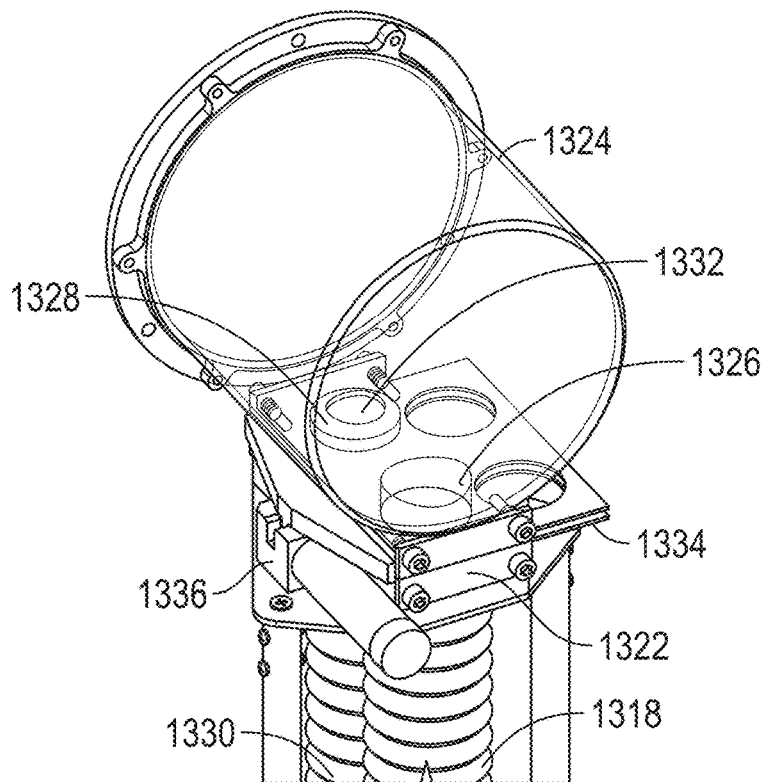
Figure 20:
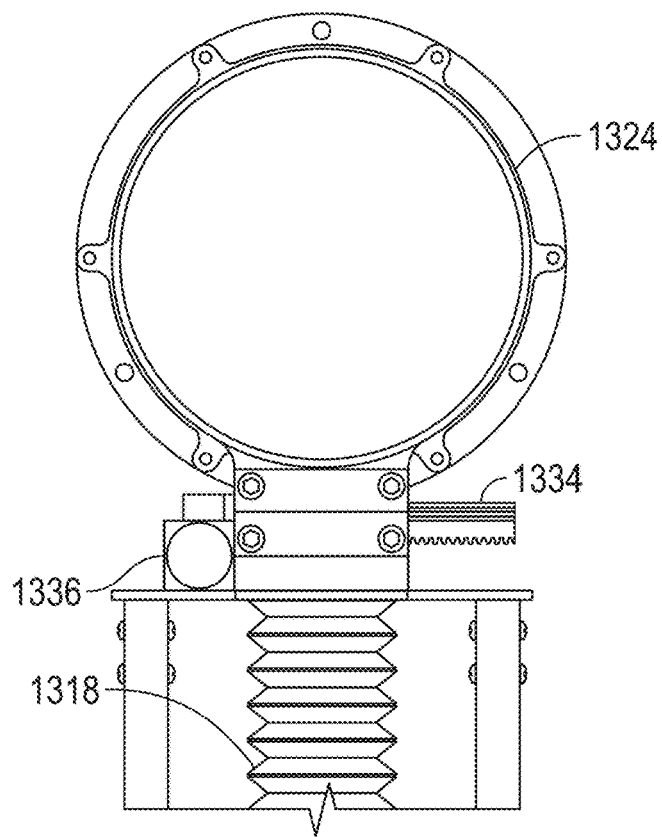

In the illustrated embodiment, a conduit 1316 exits the bellows 1314 and connects to a second bellows 1318 of the sample capture assembly 1308 that is fixed on a first end 1320. As shown in FIG. 15 and FIG. 16, the bellows 1318 is coupled to a gate valve 1322 on a second end 1324. The gate valve 1322 allows the sample container 1324 to be selectively coupled to the bellows 1318. The sample container 1324 includes an inlet 1326 and an outlet 1328. The inlet 1326 is selectively fluidly coupled to the bellows 1318 via the gate valve 1322. The outlet 1328 is selectively fluidly coupled to a third bellows 1330 that exhausts gas to the environment. A filter 1332 is disposed in the outlet 1328. In an embodiment, the bellows 1318, 1330 are metal bellows.

In an embodiment, the gate valve 1322 includes a shutter member 1334 that is movable in response to the actuation of an actuator 1336 between an open position (FIG. 17, FIG. 18) where the gas and sample mixture flow into the sample container 1324 and a closed position (FIG. 19 and FIG. 20) where the inlet 1326 and the outlet 1328 sealed from the bellows 1318, 1330.

Figure 14:
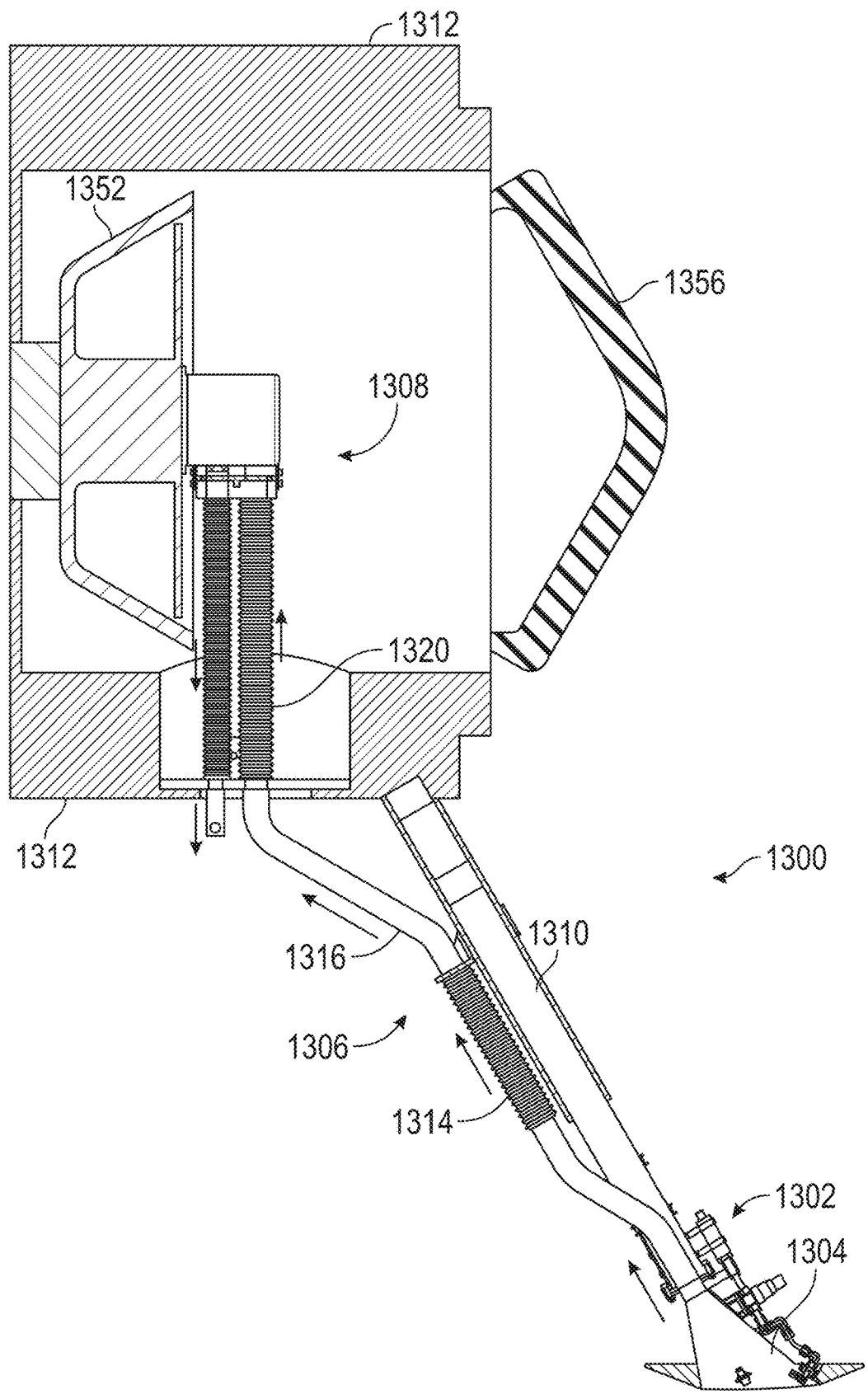
FIG. 14 is a schematic view illustrating the operation of the sample acquisition and delivery system of FIG. 13 in accordance with an embodiment.

In operation, when the sample is to be acquired, the system 1300 moves the gate valve 1322 to the open position and actuates the valves of the gas delivery system 1302. The injected pressurized gas flows into the sampler device 1304 and up the conduit 1306 into the bellows 1318. From the bellows 1318, the gas and sample mixture flows into the sample container 1324 and the particulate sample separates from the gas stream. The gas exits the sample container via outlet 1328 and is exhausted to the environment (FIG. 14). Once the sample has been acquired and deposited in the sample container 1324, the actuator 1336 is actuated and the gate valve 1322 is moved to the closed position.

In an embodiment, it is desired to store the sample container 1324 in a return capsule 1340. To do this, the sample container 1324 is separated from the sample capture assembly 1308. In an embodiment, the gate valve 1322 is configured to separate into two halves 1342, 1344. The first half 1342 is coupled to the sample container 1324 and includes an upper half of the shutter member 1334. The second half 1344 includes the actuator 1336, the lower half of the shutter member 1334, and is coupled to the bellows 1318, 1330.

Figure 21:
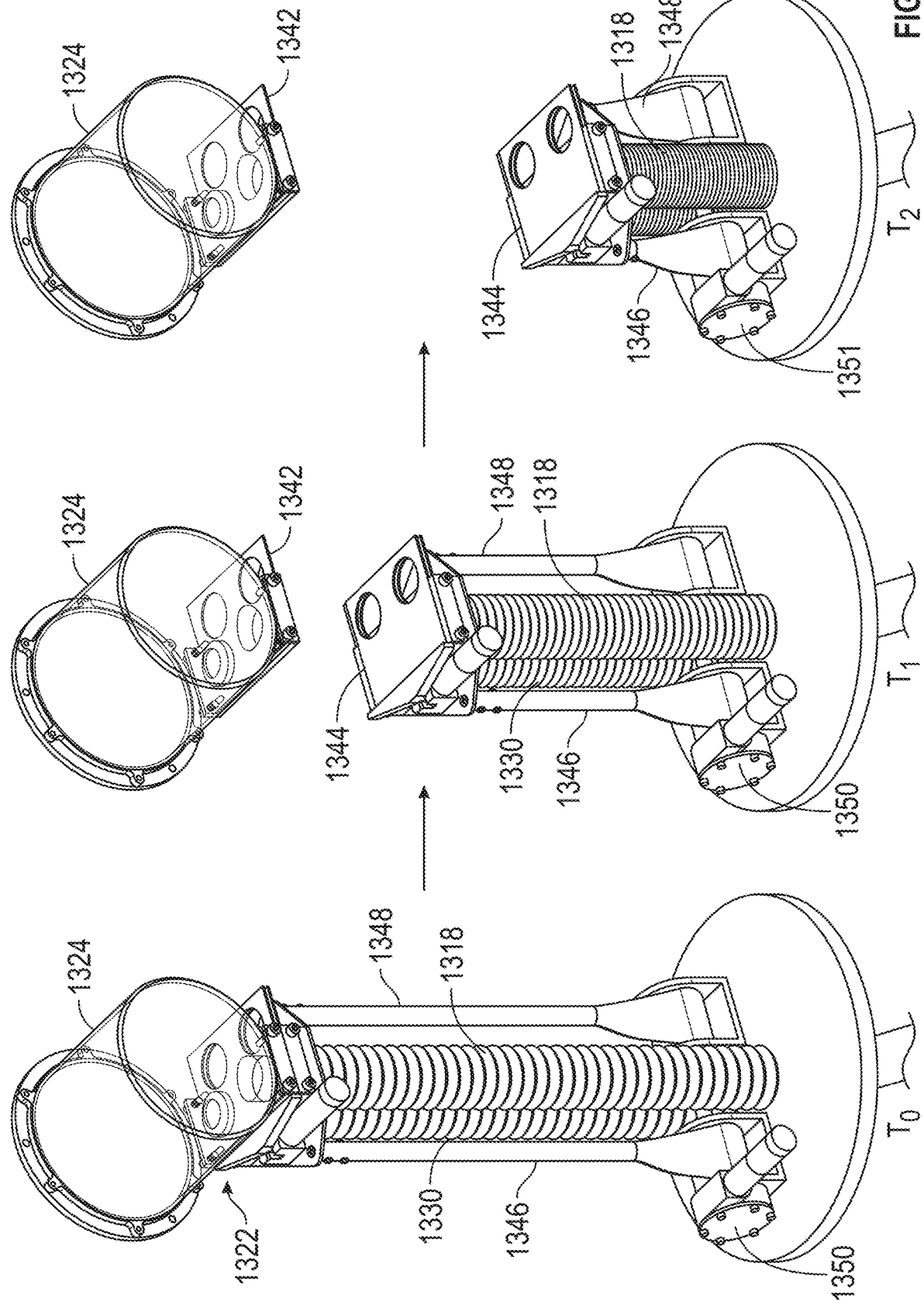

Referring now to FIG. 21, the separation of the sample container 1324 from the sample capture assembly 1308 is shown. In an embodiment, when a desired amount of sample material has been acquired and deposited into the sample container 1324, the gate valve is actuated and closed ($T=T_0$). The halves 1342, 1344 are then separated. In an embodiment, the halves 1342, 1344 are coupled by Frangibolt™ actuators manufactured by TiNi Aerospace, Inc. of San Rafael, Calif. After separation of the halves 1342, 1344, the bellows 1318, 1330 are compressed, moving the second half 1344 away from the first half 1342 and the sample container 1324.

In an embodiment, the bellows 1318, 1330 are compressed by a pair of roll up beam assemblies 1346, 1348 that are coupled to an actuator 1350. As the actuator 1350 rolls up the beam assemblies 1346, 1348, the bellows 1318, 1330 are retracted or compressed in a controlled manner (T=T$_1$).

Figure 22:
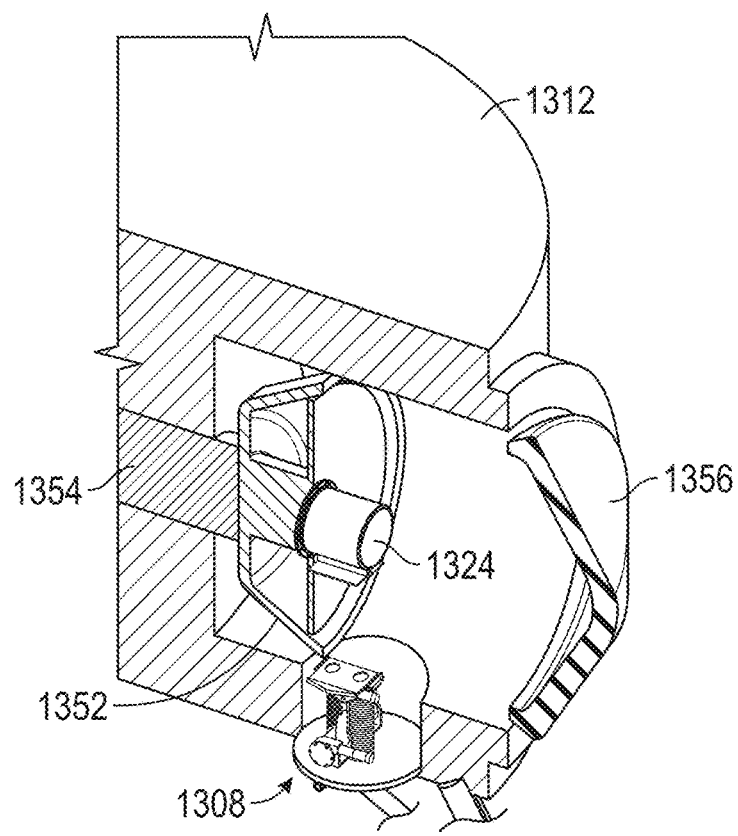
Figure 23:
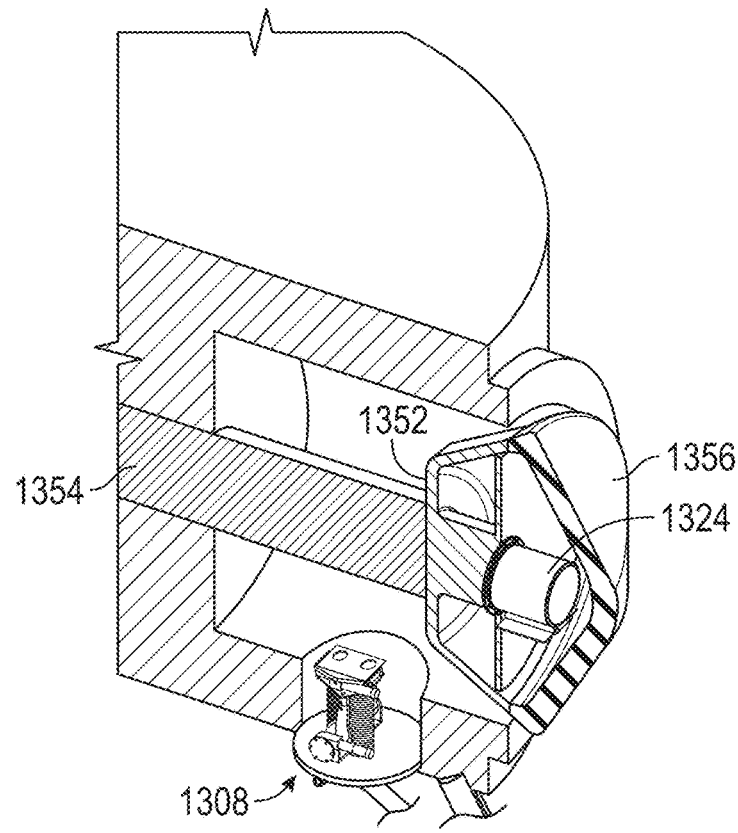

In an embodiment, the sample container 1324 is coupled to both the sample capture assembly 1308 and a first half 1352 of a return capsule shell. In this embodiment, the bellows 1318, 1330 are retracted until lower half of the shutter 1334 clears the outer diameter of the first half 1352 of the return capsule shell (T=T$_2$) as shown in FIG. 22. The return capture shell half 1352 is coupled to an actuator 1354 that is movable from a first position (FIG. 22) to a second position (FIG. 23). When in the second position, the first half 1352 mates with a second half 1356 of the return capsule shell enclosing the sample container 1324 therewithin. The actuator 1354 may then be retracted allowing the return capsule to be returned to Earth in a suitable manner known in the art.

The term "about" is intended to include the degree of error associated with measurement of the particular quantity based upon the equipment available at the time of filing the application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A sample acquisition and delivery system comprising:
   a gas delivery assembly having a storage tank with a compressed gas;
   a sampler device having a hollow interior, the hollow interior having a curved and angled surface, an open end and an exit end;
   a plurality of nozzles fluidly coupled to the curved and angled surface, at least a first nozzle of the plurality of nozzles being arranged to direct the compressed gas into the exit end, the first nozzle having a first spray angle, and a second nozzle of the plurality of nozzles having a second spray angle configured to direct a first portion of the compressed gas towards the open end and a second portion of the compressed gas towards the exit end, the first spray angle being smaller than the second spray angle; and
   a sample capture assembly having a container fluidly coupled to the exit end.

2. The system of claim 1, wherein the sample capture assembly further includes:
   an inlet conduit;
   a chamber fluidly coupled to the inlet conduit, the chamber sized to receive a container;
   an exhaust conduit fluidly coupled to the chamber; and
   a filter disposed between the exhaust conduit and the chamber.

3. The system of claim 2, wherein the chamber has an open side, the open side sized and shaped to receive the container.

4. The system of claim 1, wherein the sampler device is disposed within a footpad of an interplanetary vehicle.

5. A sample acquisition and delivery system comprising:
   a gas delivery assembly having a storage tank with a compressed gas;
   a sampler device having a hollow interior, the hollow interior having a curved and angled surface, an open end and an exit end;
   a plurality of nozzles fluidly coupled between the hollow interior and the storage tank, at least one of the plurality of nozzles arranged to direct the compressed gas towards the exit end;
   a sample capture assembly having a container fluidly coupled to the exit end, the sample capture assembly having an inlet conduit, a chamber fluidly coupled to the inlet conduit, the chamber sized to receive the container, an exhaust conduit fluidly coupled to the chamber, and a filter disposed between the exhaust conduit and the chamber, the chamber having an open side, the open size side sized and shaped to receive the container; and
   wherein the container further includes an open side and a hollow interior, the container further having an opening in a side wall and a flap member movably coupled to the side wall, the flap member being movable between an open and a closed position, the flap member covering the opening when in the closed position.

6. The system of claim 5, herein the sample capture assembly further comprises a container movement assembly operably coupled to the chamber, the container movement assembly being operably to insert the container into the chamber and remove the container when a sample has been deposited in the container.

7. The system of claim 5, wherein the chamber is disposed in a sample testing device, the sample testing device being at least one of a mass spectrometer, a gas chromatograph, and a laser spectrometer.

8. A method of acquiring and delivering a sample comprising:
   directing pressurized gas into a hollow interior of a sampler device, the hollow interior having a curved and angled surface with an open end and an exit end, the open end being in proximity to a surface containing the sample, the pressurized gas being directed by a plurality of nozzles mounted to the curved and angled surface, a first nozzle of the plurality of nozzles having a first spray angle and directing the pressurized gas into the exit end, a second nozzle of the plurality of nozzles having a second spray angle and directing a first portion of the pressurized gas toward the open end and a second portion of the pressurized gas towards the exit end, the first spray angle being smaller than the second spray angle;
   flowing a portion of the sample through the exit end with the pressurized gas; and
   receiving the portion in a container fluidly coupled to the exit end.

9. The method of claim 8, further comprising flowing the pressurized gas through a filter after receiving the portion in the container, then exhausting the pressurized gas to the environment.

10. The method of claim 9, further comprising moving a flap coupled to the container with the pressurized gas prior to receiving the portion in the container.

11. The method of claim 10, further comprising moving the container from a first position into a second position, the container receiving the sample in the second position.

12. The method of claim 11, further comprising moving the container from the second position to a third position after receiving the sample.

13. The method of claim 8, wherein the directing of the pressurized gas includes directing at least a first portion of the pressurized gas towards the exit end.

14. A sample acquisition and delivery system for an interplanetary vehicle, the system comprising:
- a gas delivery assembly having a storage tank with a compressed gas;
- a sampler device having a hollow interior, the hollow interior having a curved and angled surface, an open end and an exit end;
- a plurality of nozzles fluidly coupled to the curved and angled surface, at least a first nozzle of the plurality of nozzles having a first spray angle and arranged to direct the compressed gas towards the exit end, at least a second nozzle of the plurality of nozzles having a second spray angle and directing a first portion of the compressed gas towards the open end and a second portion of the compressed gas towards the exit end, the first spray angle being smaller than the second spray angle;
- a sample capture assembly having a container distally located from the exit end; and
- a conduit fluidly coupling the exit end to the container.

15. The system of claim 14 wherein the sample capture assembly further includes a valve disposed between the conduit and the container.

16. The system of claim 15, wherein the valve is a flap valve coupled to the container, the flap valve being movable between an open position and a closed position, the flap valve closing an opening in the container when in the closed position.

17. The system of claim 15, wherein the valve is a gate valve, the gate valve having a first portion coupled to the container and a second portion coupled to the conduit, the first portion being removably coupled to the second portion.

18. The system of claim 14, wherein at least one of the plurality of nozzles is arranged to direct a portion of the compressed gas towards a surface containing the sample.

19. The system of claim 18, wherein the sampler device is coupled to a footpad of the interplanetary vehicle, and the container is disposed within the interplanetary vehicle.

* * * * *